US008213610B2

United States Patent
Alanara et al.

(10) Patent No.: US 8,213,610 B2
(45) Date of Patent: Jul. 3, 2012

(54) GENERATION OF KEY STREAMS IN WIRELESS COMMUNICATION SYSTEMS

(75) Inventors: Seppo Matias Alanara, Oulu (FI); Henri Markus Koskinen, Espoo (FI)

(73) Assignee: Nokia Corporation, Espoo (FI)

( * ) Notice: Subject to any disclaimer, the term of this patent is extended or adjusted under 35 U.S.C. 154(b) by 394 days.

(21) Appl. No.: 12/459,088

(22) Filed: Jun. 25, 2009

(65) Prior Publication Data
US 2010/0329452 A1 Dec. 30, 2010

(51) Int. Cl.
*H04L 9/00* (2006.01)
(52) U.S. Cl. ............ 380/44; 713/160; 713/168; 380/37; 380/277
(58) Field of Classification Search .................... 380/37, 380/44, 45, 277, 278; 713/160, 168
See application file for complete search history.

(56) References Cited

U.S. PATENT DOCUMENTS

| | | | |
|---|---|---|---|
| 2006/0203823 A1* | 9/2006 | Jiang | 370/394 |
| 2008/0002594 A1* | 1/2008 | Forsberg et al. | 370/252 |
| 2008/0013729 A1* | 1/2008 | Vialen et al. | 380/270 |
| 2008/0130892 A1* | 6/2008 | Funnell et al. | 380/270 |
| 2009/0122762 A1* | 5/2009 | Kitazoe et al. | 370/331 |
| 2010/0284535 A1* | 11/2010 | Sharma et al. | 380/270 |
| 2010/0293372 A1* | 11/2010 | Fischer et al. | 713/168 |

FOREIGN PATENT DOCUMENTS

| | | |
|---|---|---|
| EP | 2 056 636 A1 | 5/2009 |
| WO | WO-2009/070576 A2 | 6/2009 |

OTHER PUBLICATIONS

"Count continuity for successive radio bearer establishments", Nokia Corporation, 3GPP TSG-RAN WG2 Meeting #64, R2-086174, Nov. 2008, 7 pgs.
3GPP TSG-RAN WG2 Meeting #64, R2-086174, Count continuity for successive radio bearer establishments, Prague, Czech Republic, Nov. 10-14, 2008, 6 pgs.

* cited by examiner

*Primary Examiner* — Vivek Srivastava
*Assistant Examiner* — Jayesh Jhaveri
(74) *Attorney, Agent, or Firm* — Harrington & Smith

(57) ABSTRACT

Security key stream generation in a communication apparatus. The method includes using a count parameter and a bearer parameter as input, value of said count parameter being incremented as security key streams are generated and value of the count parameter having a finite maximum value; detecting value of the count parameter reaching a predetermined value; and responsive to the detecting, changing value of the bearer parameter into a new value, and resetting value of the count parameter to a value below the maximum value.

18 Claims, 3 Drawing Sheets

GENERATION OF KEY STREAMS IN WIRELESS COMMUNICATION SYSTEMS

TECHNICAL FIELD

The present invention generally relates to generation of key streams in wireless communication systems. The invention relates particularly, though not exclusively, to generation of ciphering or security key streams.

BACKGROUND ART

LTE (Long Term Evolution) is a 4G wireless broadband technology. It is technological successor of 2G technologies like GSM and 3G technologies like UMTS.

In current LTE specification, RRC (Radio Resource Control) in an eNB (Evolved Node B) controls security parameters that are used in generation of security or ciphering key streams in control plane and user plane. In user plane there are security requirements, which set that repetition of packet ciphering key streams is not allowed.

Following input parameters are used for generating the ciphering key streams: COUNT, BEARER, DIRECTION, LENGTH and KEY. The BEARER and COUNT parameters are used for avoiding repetition of the ciphering key stream. A unique BEARER value is assigned for each new user plane bearer that is to be established and value of the COUNT parameter is then incremented for each ciphered block to ensure unique combination of input parameters.

The value space of the BEARER and COUNT parameters is however limited. When all available BEARER values have been consumed (the number of established bearers exceeds the number of available BEARER values) or value of the COUNT parameter reaches its maximum (the wrap-around point) for a given bearer, there is a need to change the value of some other input parameter to ensure unique combination of input parameters (i.e. to avoid repetition of the ciphering key stream). The current solution to this is to perform an intra-cell handover, which renews the KEY parameter, and thereby opens the value spaces of the BEARER and COUNT parameters for reuse. Present solutions of using the BEARER and COUNT parameters to prevent key stream repetition are discussed in more detail e.g. in 3GPP TSG-RAN WG2 meeting contribution 3GPP R2-086174, November 2008.

A downside of using intra-cell handovers is that regular handovers and intra-cell handovers are complex operations and require additional signalling in eNB and UE (User Equipment). Additionally, handovers may cause some extra jitter/delay or packet loss for user plane bearers. Thus there is room for further considerations.

SUMMARY

According to a first example aspect of the invention there is provided a method comprising:
using a count parameter and a bearer parameter as input in generation of a security key stream in a communication apparatus, value of said count parameter being incremented as security key streams are generated and value of said count parameter having a finite maximum value,
detecting value of said count parameter reaching a predetermined value, and responsive to said detecting, changing value of said bearer parameter into a new value, and resetting value of said count parameter to a value below said maximum value.

According to a second example aspect of the invention there is provided an apparatus, comprising:
at least one processor; and
at least one memory embodying computer program code;
the at least one memory and the computer program code configured to, with the at least one processor, cause the apparatus to perform:
using a count parameter and a bearer parameter as input in generation of a security key stream, the apparatus being configured to increment value of said count parameter as security key streams are generated and value of said count parameter having a finite maximum value,
detecting value of said count parameter reaching a predetermined value, and responsive to said detecting, changing value of said bearer parameter into a new value, and resetting value of said count parameter to a value below said maximum value.

According to a third example aspect of the invention there is provided a computer program executable in an apparatus, comprising computer executable program code which, when executed by at least one processor of an apparatus, causes the apparatus to perform:
using a count parameter and a bearer parameter as input in generation of a security key stream in a communication apparatus, value of said count parameter being incremented as security key streams are generated and value of said count parameter having a finite maximum value,
detecting value of said count parameter reaching a predetermined value, and responsive to said detecting, changing value of said bearer parameter into a new value, and resetting value of said count parameter to a value below said maximum value.

The computer program of the third aspect may be stored or embodied on a computer readable memory medium. The memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

In certain example embodiments, the predetermined value is the maximum value of the count parameter.

In certain example embodiments, the value of said count parameter is reset to a minimum value of said count parameter.

In certain example embodiments, the value of said bearer parameter is changed to an unused bearer parameter value.

In certain example embodiments, the value of said bearer parameter is changed to a previously used bearer parameter value, wherein the previously used bearer parameter value is not currently in use in said communication apparatus.

In certain example embodiments, the previously used bearer parameter value has a partially used count value space.

In certain example embodiments, the value of said count parameter is reset to a smallest unused count value in count value space of said previously used bearer parameter.

In certain example embodiments, the security key stream generation is performed in user plane.

In certain example embodiments, the security key stream generation is configured for use in Long Term Evolution system.

Various example embodiments of the present invention are illustrated hereinafter in the detailed description of the invention as well as in the dependent claims appended hereto. The embodiments are illustrated with reference to selected aspects of the invention. A person skilled in the art appreciates that any embodiment of the invention may be combined with other embodiment(s) within the same aspect. Furthermore, any embodiment may apply to other aspects as well either alone or in combination with other embodiment(s).

BRIEF DESCRIPTION OF THE DRAWINGS

The invention will be described, by way of example only, with reference to the accompanying drawings, in which.

DETAILED DESCRIPTION

Figure 1:
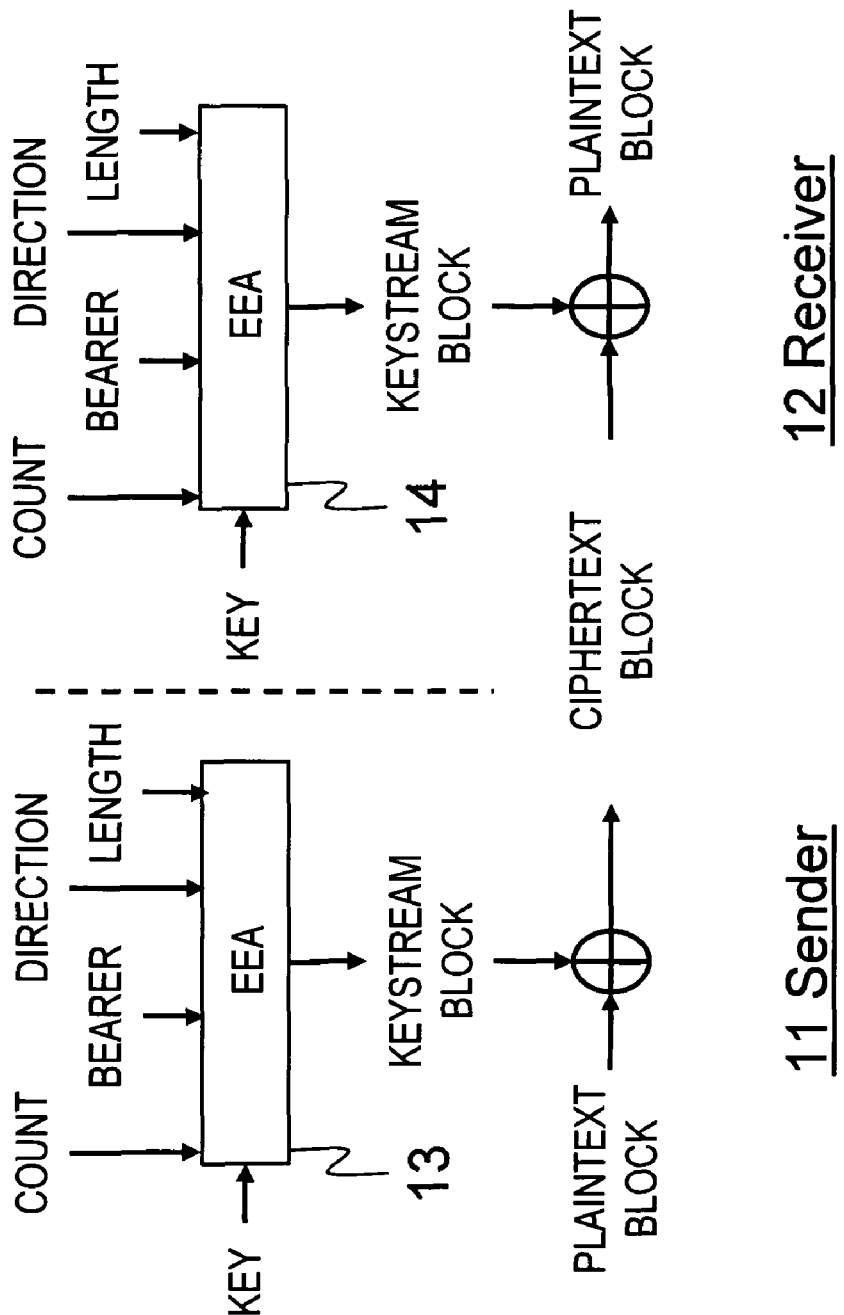
FIG. 1 illustrates generation and use of ciphering key streams in general.

FIG. 1 illustrates generation and use of ciphering key streams in general. The Figure shows a sender side 11 and a receiver side 12. In the sender side 11 a key stream is generated by means of a key stream generation algorithm 13 and the generated key stream is used for ciphering a plaintext data block. The resulting ciphered data block is transmitted to the receiver side 12. In the receiver side 12 a key stream is generated by means of a key stream generation algorithm 14 and the generated key stream is used for deciphering the ciphered data block in order to obtain the original plaintext data block. The key streams that are generated in the sender and receiver side are the same.

Input parameters to the key stream generation algorithm 13 and 14 are KEY, COUNT, BEARER, DIRECTION, and LENGTH.

Every time a new user plane bearer is established, a distinct value of the BEARER parameter is assigned for the bearer. In this way bearers are differentiated from other bearers. In LTE, Data Radio Bearer (DRB) Identity as specified in RRC specification is used as the value of the BEARER parameter for user plane ciphering. eNB maintains a list of already used DRB Identities for each UE RRC Connection so that a distinct value can be assigned for new bearers.

The value of the COUNT parameter equals to concatenation of PDCP SN (Packet Data Convergence Protocol Sequence Number) and HFN (Hyper Frame Number) and is 32 bits long. For each ciphered block, the value of the COUNT parameter is incremented. After the value of the COUNT parameter has reached its maximum it wraps around to 0.

In LTE, the ciphering keys for the control plane and for the user plane are $K_{RRCenc}$ and $K_{UPenc}$, respectively. In this case the KEY parameter is the user plane ciphering key. The DIRECTION parameter is one bit field, which defines whether transmission is in uplink or downlink. The LENGTH parameter indicates the length of the bit stream to be ciphered. The LENGTH parameter does not change the ciphered bits, but just specifies the length of the output bit stream.

Like mentioned above, in prior art an intra-cell handover is performed in order to renew the value of the KEY parameter when all available values of the BEARER parameter have been consumed or the value of the COUNT parameter reaches its maximum (the wrap-around point) for a given bearer. It is noted that user plane bearers normally reach the wrap-around point at different times depending e.g. on bit rate and bearer establishment time. Changing the value of the KEY parameter renews the input for all of user plane bearers simultaneously, i.e. after that all BEARER and COUNT values are reusable for all bearers. In this way some unused values of the COUNT parameter are typically wasted every time the handover is performed. This is the case at least when there are more than one bearer. Moreover, handovers are likely to cause discontinuity in the communication service.

In certain embodiments of the invention it is proposed that instead of always using intra-cell handovers, a new value of the BEARER parameter is set for the user plane radio bearers in case the value of the COUNT parameter wraps up. In an embodiment the new value of the BEARER parameter is an unused BEARER value. With the new unused value of the BEARER parameter the COUNT can again be cycled from 0 to the maximum value. In another embodiment the new value of the BEARER parameter is a previously used BEARER value. A previously used BEARER value is a BEARER value that is currently not in use, but was previously used in connection with another bearer. Therefore such BEARER value has a partially used COUNT value space. (It is noted that some previously used BEARER values may have a fully consumed COUNT value space. Such previously used BEARER values can be ignored when selecting a new value of the BEARER parameter.) In this case, it may not be possible to cycle the COUNT again from 0, but at least some COUNT values are released in that case as well. These are discussed in more detail below.

A difference between certain embodiments of the invention and prior solutions is that in prior solutions only one value of the BEARER parameter is used per one bearer. I.e. in prior solutions the value of the BEARER parameter is chosen when a bearer is established and it is not changed during the lifetime of the bearer. Whereas in certain embodiments of the invention, a new value of the BEARER parameter may be configured for a bearer during its lifetime. I.e. in certain embodiments, instead of performing intra-cell handover and thereby changing the value of the KEY parameter, the value of the BEARER parameter is changed for a given bearer, if the value of the COUNT parameter reaches its wrap-around point (the maximum value). In this way the period between intra-cell handovers can be extended and thereby increased system performance may be achieved as handovers occur less often.

One should note that in addition to changing the value of the BEARER parameter according to certain embodiments of the invention one may continue to use intra-cell handovers where necessary.

In the following examples the count value space is used up to its maximum, i.e. a new value is configured for the BEARER parameter when COUNT reaches its maximum value. In certain embodiments it is however possible that a new value is configured for the BEARER parameter when COUNT reaches a predetermined value that is not necessarily the maximum value of the COUNT parameter.

Some example embodiments of the invention are herein discussed in connection with LTE technology and related standard specifications. This however does not exclude use of the embodiments in connection with some other, currently existing or future, technology or standard specifications.

Figure 2:
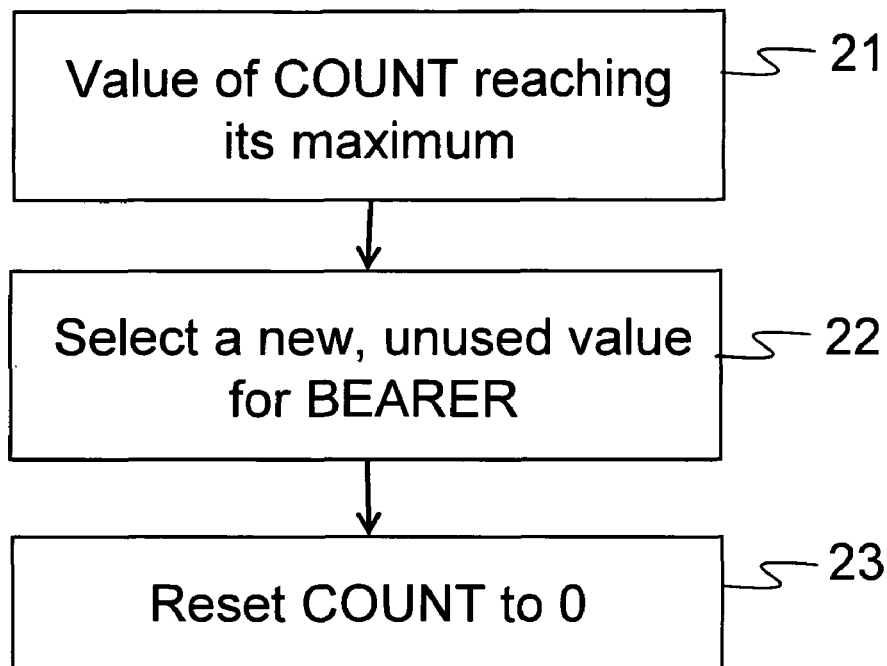
FIG. 2 illustrates a method of an embodiment.

FIG. 2 illustrates a method of an embodiment.

In phase 21 it is detected that the value of a COUNT parameter is reaching its maximum (or its wrap-around point). Responsive to this detecting a new, unused value is selected for the BEARER parameter in phase 22. After this the value of the COUNT parameter is set to 0 and incremented as necessary in phase 23. After the reconfiguration of the value of the BEARER parameter, the value of the COUNT parameter can be again increased up to its wrap-around point. Where necessary the process may be repeated, i.e. the process may resume to phase 21 as many times as applicable.

One should note that instead of setting the value of the COUNT parameter to 0, it can be set to some other minimum value defined for the COUNT parameter.

By reconfiguring a new unused value of the BEARER parameter for a given bearer and cycling the value of the COUNT parameter again from 0 to its maximum value the lifetime of the associated bearer can be doubled with regard to the requirement of preventing repetition of key streams. Additionally, when the COUNT reaches its maximum for the second time, a new unused value of the BEARER parameter can again be assigned for the bearer. Thereby the lifetime of the bearer is again increased. This can continue as long as needed. The only requirement is that a new value for the BEARER parameter needs to be available every time the COUNT value reaches its maximum. If there is only one bearer e.g. in case of modem usage, in current specifications of the LTE, the value of the BEARER parameter can be changed 32 times for the same bearer and the same bearer can thus be sustained for more than 4 years.

In RRC p2p (peer-to-peer) signalling user plane bearers are identified with an EPS (Enhanced Packet System) Bearer ID. In an embodiment, changing of the value of the BEARER parameter is implemented as follows: when a bearer (an EPS Bearer) is reconfigured with a new DRB Identity, PDCP is reconfigured to use the new DRB Identity as a new value of the BEARER parameter in key stream generation.

There is a need to synchronize the new value of the BEARER parameter i.e. the new DRB Identity so that both UE and eNB use the same value of the BEARER parameter. In an embodiment, this is performed as follows: PDCP identifies locally that an already existing EPS Bearer is being reconfigured with a new DRB Identity and executes changing of the value of the BEARER parameter synchronized to the COUNT value reaching its wrap-around point. In this way a new value of the BEARER parameter is taken into use when COUNT wraps around to 0 and this can be done substantially simultaneously both in UE and eNB.

In an embodiment, a SFN (System Frame Number) after which the change will be done is defined. In order to accomplish this an execution time parameter may be added to the RRC Connection Reconfiguration Command.

In an embodiment a new local request from PDCP to RRC is implemented. The local request is used for requesting a new value for the BEARER parameter to replace the current value of the BEARER parameter when PDCP detects that the value of the COUNT parameter is about to reach its wrap-around point within a predefined time period. Such time period may be e.g. 10 seconds (other options could be 5, 20 and 50 seconds). In response to the request the RRC provides next available BEARER value to PDCP. This procedure can be done simultaneously both in the eNB and the UE without adding any new air interface signalling.

Figure 3:
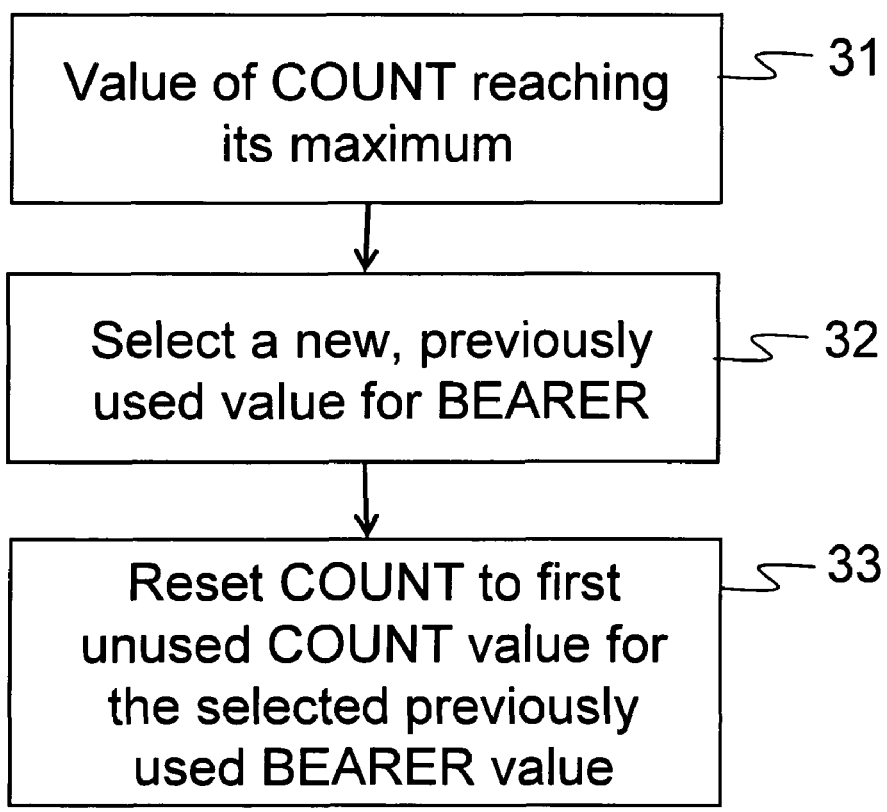
FIG. 3 illustrates a method of another embodiment.

Instead of using only completely unused values of the BEARER parameter also previously used values may be used. Such previously used value of the BEARER parameter is currently not in use by any bearer but has been previously in use in connection with some EPS bearer. All values of the COUNT parameter for such previously used BEARER value should not have been used, though. I.e. the value of the COUNT should not have reached its maximum in connection with previous use of the value. Such value of the BEARER parameter can be defined as a partially used value of the BEARER parameter or as a previously used value of the BEARER parameter having a partially used (or unused) COUNT value space. FIG. 3 illustrates a method of such embodiment.

In phase 31 it is detected that the value of a COUNT parameter is reaching its maximum (or its wrap-around point). Responsive to this detecting, a new, previously used value is selected for the BEARER parameter in phase 32. After this the value of the COUNT parameter is set to first unused COUNT value associated with the selected BEARER value and incremented from thereon as necessary in phase 33. Thereby, after the reconfiguration of the value of the BEARER parameter, the value of the COUNT parameter can be again increased up to its wrap-around point (but in this case only from the first unused value onwards and not all the way from 0). By means of this embodiment one achieves effective use of COUNT values. I.e. COUNT values for a certain value of the BEARER parameter are less likely to go wasted.

In an embodiment, in order to know the first unused value of the COUNT parameter for a given value of the BEARER parameter, eNB and UE keep a record of the values of the COUNT parameter, which have been used for given values of the BEARER parameters.

With the embodiment of FIG. 3 it is possible to reuse a value of the BEARER parameter for a new bearer. Additionally, it is possible to use a value of the BEARER parameter until its COUNT has reached the maximum value. After that a new value of the BEARER parameter (a new BEARER identity) is taken into use. This type of continued use is possible when any bearer is released before all COUNT values for the associated value of the BEARER parameter have been used.

It is noted that there may be a slight unsynchronization in the COUNT values in UE and eNB right before changing the value of the BEARER parameter. E.g. retransmissions may cause this. The value of the COUNT parameter equals to concatenation of PDCP SN (Packet Data Convergence Protocol Sequence Number) and HFN (Hyper Frame Number). In an embodiment, when starting to reuse a partially used value of the BEARER parameter, the value of the COUNT parameter that is taken into use is defined by taking the next HFN value and starting the PDCP SN from 0 to avoid effects of such unsynchronization. In this way, both the UE and eNB will start COUNT from the same value despite of that such unsynchronization may exist right before changing the value of the BEARER parameter. Additionally, in such case, PDCP may be configured to keep track on changes in the KEY parameter. If the KEY parameter is changed, both the HFN and SN are restarted from 0 and all stored values of the BEARER/COUNT parameters can be cleared.

Figure 4:
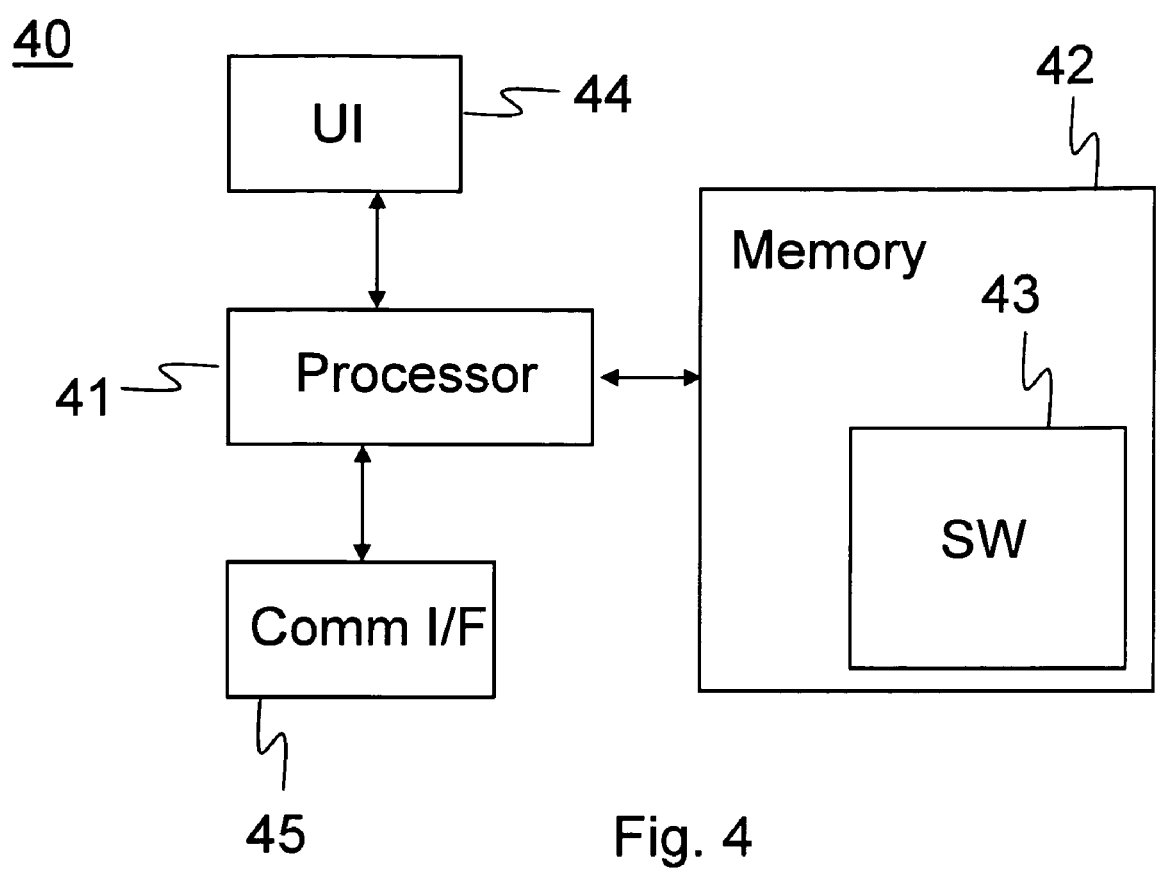
FIG. 4 shows a block diagram of an apparatus in accordance with certain embodiments.

FIG. 4 presents an example block diagram of an apparatus 40 in which various embodiments of the invention may be applied. This may be a user device or apparatus, such as a mobile terminal, or a network element of a radio communication networks, such as eNB for example.

The general structure of the apparatus 40 comprises a communication interface module 45, a processor 41 coupled to the communication interface module 45, and a memory 42 coupled to the processor 41. The apparatus further comprises software 43 stored in the memory 42 and operable to be loaded into and executed in the processor 41. The software 43 may comprise one or more software modules and can be in the form of a computer program product. The apparatus 40 further comprises a user interface controller 44 coupled to the processor 41.

The communication interface module 45 may be, e.g., a radio interface module, such as a WLAN, Bluetooth, GSM/GPRS, CDMA, WCDMA or LTE radio module. The communication interface module 45 may be integrated into the apparatus 40 or into an adapter, card or the like that may be inserted into a suitable slot or port of the apparatus 40. The communication interface module 45 may support one radio interface technology or a plurality of technologies. FIG. 4 shows one communication interface module 45, but the apparatus 40 may comprise a plurality of communication interface modules 45.

The processor 41 may be, e.g., a central processing unit (CPU), a microprocessor, a digital signal processor (DSP), a graphics processing unit, or the like. FIG. 4 shows one processor 41, but the apparatus 40 may comprise a plurality of processors.

The memory 42 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 40 may comprise a plurality of memories. The memory 42 may be constructed as a part of the apparatus 40 or it may be inserted into a slot, port, or the like of the apparatus 40 by a user. The memory 42 may serve the sole purpose of storing data, or it may be constructed as a part of an apparatus serving other purposes, such as processing data.

The user interface controller 44 may comprise circuitry for receiving input from a user of the apparatus 40, e.g., via a keyboard, graphical user interface shown on the display of the apparatus 40, speech recognition circuitry, or an accessory device, such as a headset, and for providing output to the user via, e.g., a graphical user interface or a loudspeaker. In certain cases the user interface controller 44 does not exist. In addition to or instead of the user interface controller 44, the apparatus 40 may be controlled over a remote connection.

A skilled person appreciates that in addition to the elements shown in FIG. 4, the apparatus 40 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 40 may comprise a disposable or rechargeable battery (not shown) for powering the apparatus 40 when external power if external power supply is not available.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method comprising:
using a count parameter and a bearer parameter as inputs in generation of a security key stream in a communication apparatus, a value of said count parameter being incremented as security key streams are generated and the value of said count parameter having a finite maximum value defining a wrap-around point that represents an upper limit for the count parameter,
detecting the value of said count parameter reaching a predetermined value, and
responsive to said detecting, changing a value of said bearer parameter into a new value, and resetting the value of said count parameter to a value below said maximum value;
wherein the value of said bearer parameter is changed to an unused bearer parameter value for a given bearer in response to the value of said count parameter reaching the wrap-around point.

2. The method of claim 1, wherein said predetermined value is said maximum value of said count parameter.

3. The method of claim 1, wherein said value of said count parameter is reset to a minimum value of said count parameter representing a lowest possible value that the count parameter may attain.

4. The method of claim 1, wherein said value of said bearer parameter is changed to a previously used bearer parameter value, wherein the previously used bearer parameter value is not currently in use in said communication apparatus.

5. The method of claim 4, wherein said previously used bearer parameter value has a partially used count value space.

6. The method of claim 5, wherein said value of said count parameter is reset to a smallest unused count value in count value space of said previously used bearer parameter.

7. The method of claim 1, further comprising performing said security key stream generation in user plane.

8. An apparatus, comprising:
at least one processor; and
at least one memory embodying computer program code;
the at least one memory and the computer program code configured to, with the at least one processor, cause the apparatus to perform:
using a count parameter and a bearer parameter as inputs in generation of a security key stream, the apparatus being configured to increment a value of said count parameter as security key streams are generated and the value of said count parameter having a finite maximum value defining a wrap-around point that represents an upper limit for the count parameter, and
changing a value of said bearer parameter to an unused bearer parameter value for a given bearer in response to the value of said count parameter reaching the wrap-around point; and
resetting the value of said count parameter to a value below said finite maximum value.

9. The apparatus of claim 8, wherein said predetermined value is said maximum value of said count parameter.

10. The apparatus of claim 8, wherein the memory, computer program and processor are configured to cause the apparatus to reset said value of said count parameter to a minimum value of said count parameter representing a lowest possible value that the count parameter may attain.

11. The apparatus of claim 8, wherein the memory, computer program and processor are configured to cause the apparatus to change said value of said bearer parameter to a previously used bearer parameter value, wherein the previously used bearer parameter value is not currently in use in said communication apparatus.

12. The apparatus of claim 11, wherein said previously used bearer parameter value has a partially used count value space.

13. The apparatus of claim 12, wherein the memory, computer program and processor are configured to cause the apparatus to reset said value of said count parameter to a smallest unused count value in count value space of said previously used bearer parameter.

14. The apparatus according to claim 8, wherein said apparatus is configured for use in a Long Term Evolution system.

15. A non-transitory computer readable memory medium embodying a computer program executable in an apparatus, comprising computer executable program code which, when executed by at least one processor of an apparatus, causes the apparatus to perform:
- using a count parameter and a bearer parameter as inputs in generation of a security key stream in a communication apparatus, a value of said count parameter being incremented as security key streams are generated and the value of said count parameter having a finite predetermined maximum value defining a wrap-around point that represents an upper limit for the count parameter,
- detecting the value of said count parameter reaching the finite predetermined maximum value,
- responsive to said detecting, changing a value of said bearer parameter to an unused bearer parameter value for a given bearer in response to the value of said count parameter reaching the wrap-around point; and
- resetting the value of said count parameter to a value below said finite predetermined maximum value.

16. The non-transitory computer readable memory medium of claim 15, wherein said predetermined value is said maximum value of said count parameter.

17. The non-transitory computer readable memory medium of claim 15, wherein the computer executable program code which, when executed by at least one processor of an apparatus, causes the apparatus to perform: changing said value of said bearer parameter to an unused bearer parameter value.

18. The non-transitory computer readable memory medium of claim 15, wherein the computer executable program code which, when executed by at least one processor of an apparatus, causes the apparatus to perform: changing said value of said bearer parameter to a previously used bearer parameter value, wherein the previously used bearer parameter value is not currently in use in said communication apparatus.

* * * * *